Nov. 22, 1927.   1,649,889
E. J. CARROLL
ELECTRICALLY DRIVEN EXTRACTOR
Filed Aug. 24, 1921
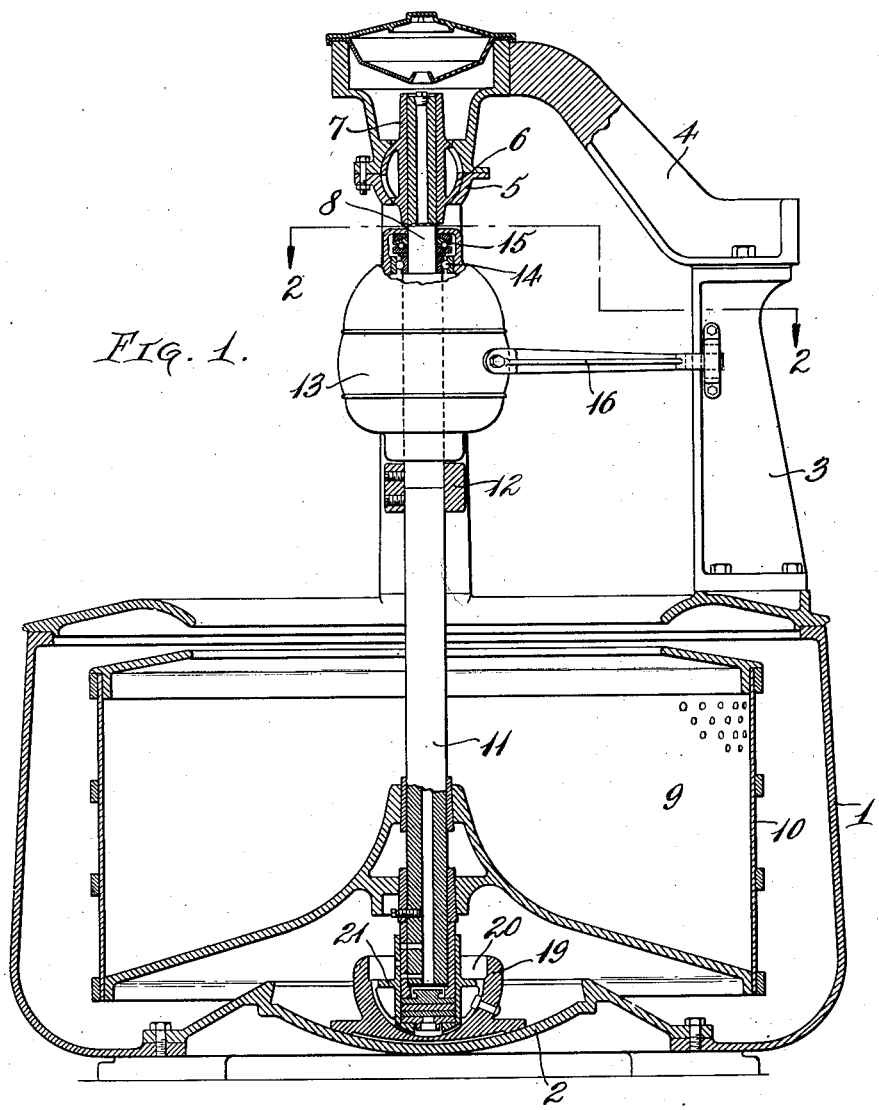
FIG. 1.
FIG. 2.
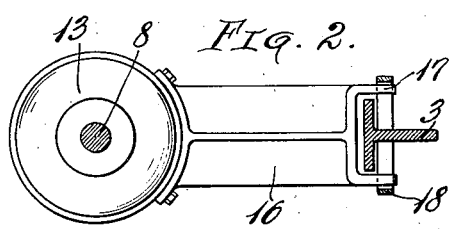
INVENTOR
Emil J. Carroll
BY Brockett and Hyde,
ATTORNEYS Patented Nov. 22, 1927.

1,649,889

UNITED STATES PATENT OFFICE.

EMIL J. CARROLL, OF NORWOOD, OHIO, ASSIGNOR TO THE AMERICAN LAUNDRY MACHINERY COMPANY, OF NORWOOD STATION, CINCINNATI, OHIO, A CORPORATION OF OHIO.

ELECTRICALLY-DRIVEN EXTRACTOR.

Application filed August 24, 1921. Serial No. 495,095.

This invention relates to centrifugal extractors of the over driven type.

The object of the invention is to provide an over driven extractor embodying an electric motor for rotating the spindle, said motor being connected directly to the spindle by coupling its armature or rotor thereto and connecting its field or stator to the stationary frame to prevent rotation, thereby avoiding shock, jar and vibration in the motor parts which are produced by the effects of unbalanced loads and also enabling electrical braking effects to be secured and doing away with many of the mechanical devices usually required for such structures.

The invention comprises the construction and arrangement of parts hereinafter described and claimed.

In the drawings, Fig. 1 is a vertical longitudinal section illustrating one embodiment of the invention; and Fig. 2 is a detail sectional plan view on the line 2—2, Fig. 1, the curb and basket being omitted.

The structure shown in the drawings comprises the stationary outer curb or casing 1 provided with the usual bottom bearing plate 2 to support the rotating mechanism and a standard or column 3 having an arm 4 provided with a socket 5 for the ball 6 of a bearing sleeve 7 for the armature or rotor 8 of the motor, this arrangement providing in effect a ball and socket joint to enable the spindle and basket to swing or oscillate laterally in all directions about an upper point.

9 indicates the rotating basket having the usual outer perforated wall 10, said basket being carried by a spindle 11 connected to the armature or rotor by a coupling 12. 13 indicates the field frame or stator of the motor, which is supported from the armature or rotor by the radial and end thrust bearings 14, 15. Said field frame or stator is prevented from rotating by a retainer or torque arm 16 which is attached to said field frame or stator and extends laterally therefrom, its outer end having short fingers 17 embracing the pillar 3 and riding in recesses or openings beneath straps 18 attached to the pillar.

The lower end of the spindle 11 is provided with a bearing member 19 resting upon the bearing plate 2 and having a semispherical socket 20 to receive the ball member 21 at the lower end of the spindle. The upper concave surface of the bearing member upon which member 19 rests is curved spherically on a radius less than the distance from said bearing plate to the center of the ball and socket joint 5, 6. As a consequence, if the basket and spindle swing to one side because of an unbalanced load, bearing member 19 travels laterally and rides up the concave surface of plate 2 so as to slightly elevate the entire basket, spindle, and motor. Gravity therefore assists in returning the spindle to normal central position. The straps 18 are made of such shape as to permit vertical movement of the fingers 17 beneath them as the motor rises and falls.

In the arrangement described the motor field frame or stator is held against rotation by the engagement of arm 16 with the frame, but the spindle, basket and motor are allowed to swing laterally with unbalanced loads as well as to rise and fall in the manner described.

No mechanical brake or drive pulley is necessary as the braking effect can be secured by reverse phase or dynamic braking in the motor itself. The motor can be made with very small clearance as all of its parts are supported directly by the spindle and no jarring or vibrating effects are transmitted to the motor parts.

Having described my invention, I claim:

1. An overdriven extractor, comprising a stationary support, a rotating spindle and basket mounted to oscillate on said support about a center above said basket, supporting bearing means at the lower end of said spindle arranged to produce upward motion of the spindle and basket as they swing laterally, electric motor means supported in normally running arrangement upon said spindle with the armature or rotor directly connected to the spindle in fixed relation with the basket, means carried by the rotating spindle for supporting the motor field or stator, and means extending to a stationary part for preventing rotation of the motor field or stator.

2. An extractor, comprising a stationary frame having a curb, an extractor spindle and basket mounted to oscillate about an upper center in said frame, supporting bearing means at the lower end of said spindle arranged to produce upward motion of the spindle and basket as they swing laterally, an electric motor having its armature or rotor directly connected to the spindle and and also having a field frame or stator, and means connecting the field frame or stator to the stationary frame and arranged to permit lateral and vertical motion but prevent rotation of the field frame or stator.

In testimony whereof I hereby affix my signature.

EMIL J. CARROLL.